US007421664B2

(12) United States Patent
Wattenberg et al.

(10) Patent No.: US 7,421,664 B2
(45) Date of Patent: Sep. 2, 2008

(54) SYSTEM AND METHOD FOR PROVIDING A CATEGORY SEPARATOR IN A LIST OF DOCUMENTS

(75) Inventors: Martin M. Wattenberg, Winchester, MA (US); Jodi L. Coppinger, Merrimack, NH (US); Bernard J. Kerr, Boston, MA (US); Darrell J. Loverin, Boxborough, MA (US); Paul B. Moody, Hyde Park, VT (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 10/745,487

(22) Filed: Dec. 29, 2003

(65) Prior Publication Data

US 2005/0144572 A1 Jun. 30, 2005

(51) Int. Cl.
*G06F 3/048* (2006.01)
(52) U.S. Cl. .................... 715/823; 715/772; 715/821; 715/829
(58) Field of Classification Search ................ 715/784, 715/787, 790–797, 817, 775, 752, 521, 973, 715/520, 712, 776, 777, 828, 853–856, 772, 715/821–824, 829; 709/206
See application file for complete search history.

(56) References Cited

U.S. PATENT DOCUMENTS

| | | | | |
|---|---|---|---|---|
| 4,694,406 A | * | 9/1987 | Shibui et al. ................ 345/684 |
| 5,038,138 A | * | 8/1991 | Akiyama et al. ............ 345/684 |
| 5,175,813 A | * | 12/1992 | Golding et al. ............. 715/786 |
| 5,317,306 A | * | 5/1994 | Abraham et al. ........... 345/684 |
| 5,361,361 A | * | 11/1994 | Hickman et al. ............ 715/705 |

(Continued)

FOREIGN PATENT DOCUMENTS

EP    1 232 434 B1    8/2005

(Continued)

OTHER PUBLICATIONS

Venolia, Gina Danielle; Neustaedter, Carman, "Understanding Sequence and Reply Relationships within Email Converstation: A Mixed-Model Visualization," pp. 361-368, CHI 2003, Apr. 5-10, 2003.*

(Continued)

*Primary Examiner*—Ba Huynh
*Assistant Examiner*—Eric A Wiener
(74) *Attorney, Agent, or Firm*—Pillsbury Winthrop Shaw Pittman, LLP

(57) ABSTRACT

A system and method is provided to assist a user in selecting, identifying, and handling email messages. A selection color module may provide for the display of color coding and selection highlighting. The selection color module may provide a secondary highlighting color to indicate messages related to a selected message. A category navigation module may provide one or more of the following: an indicator that provides the user with a number of items that are off the screen for a particular category, a command that causes the first entry for a category to be scrolled into view, a label to indicate the number of items in a particular category matching a particular criteria, and/or a control for scrolling between next or previous categories.

18 Claims, 5 Drawing Sheets

U.S. PATENT DOCUMENTS

| | | | | |
|---|---|---|---|---|
| 5,394,523 | A | 2/1995 | Harris | 395/162 |
| 5,398,310 | A * | 3/1995 | Tchao et al. | 715/541 |
| 5,563,996 | A * | 10/1996 | Tchao | 715/521 |
| 5,610,828 | A | 3/1997 | Kodosky et al. | 364/489 |
| 5,737,553 | A | 4/1998 | Bartok | 395/339 |
| 5,999,159 | A * | 12/1999 | Isomura | 345/418 |
| 5,999,179 | A | 12/1999 | Kekic et al. | 345/349 |
| 6,088,696 | A | 7/2000 | Moon et al. | 707/10 |
| 6,154,740 | A | 11/2000 | Shah | 707/7 |
| 6,252,597 | B1 | 6/2001 | Lokuge | 345/353 |
| 6,272,537 | B1 | 8/2001 | Kekic et al. | 709/223 |
| 6,300,967 | B1 | 10/2001 | Wagner et al. | 345/784 |
| 6,388,682 | B1 | 5/2002 | Kurtzberg et al. | 345/764 |
| 6,396,513 | B1 | 5/2002 | Helfman et al. | 345/752 |
| 6,424,995 | B1 | 7/2002 | Shuman | 709/206 |
| 6,442,440 | B1 | 8/2002 | Miller | 700/83 |
| 6,549,218 | B1 | 4/2003 | Gershony et al. | 345/781 |
| 6,563,518 | B1 | 5/2003 | Gipalo | 345/762 |
| 6,700,591 | B1 | 3/2004 | Sharpe | 345/762 |
| 6,756,997 | B1 | 6/2004 | Ward, III et al. | 345/716 |
| 6,826,596 | B1 | 11/2004 | Suzuki | 709/206 |
| 6,930,709 | B1 | 8/2005 | Creamer et al. | 345/211.3 |
| 7,028,263 | B2 | 4/2006 | Maguire | 715/758 |
| 7,030,890 | B1 | 4/2006 | Jouet et al. | 345/619 |
| 7,062,536 | B2 | 6/2006 | Fellenstein et al. | 709/206 |
| 7,117,445 | B2 | 10/2006 | Berger | 715/752 |
| 7,137,074 | B1 | 11/2006 | Newton et al. | 715/835 |
| 7,139,800 | B2 | 11/2006 | Bellotti et al. | 709/206 |
| 2002/0051015 | A1 | 5/2002 | Matoba | 345/764 |
| 2002/0073157 | A1 | 6/2002 | Newman et al. | 709/206 |
| 2002/0128047 | A1 | 9/2002 | Gates | 455/566 |
| 2002/0138834 | A1 * | 9/2002 | Gerba et al. | 725/42 |
| 2002/0174183 | A1 | 11/2002 | Saeidi | 709/206 |
| 2002/0186252 | A1 * | 12/2002 | Himmel et al. | 345/787 |
| 2002/0194280 | A1 | 12/2002 | Altavilla et al. | 709/206 |
| 2003/0014482 | A1 | 1/2003 | Toyota et al. | 709/203 |
| 2003/0101065 | A1 | 5/2003 | Rohall et al. | 705/1 |
| 2003/0146941 | A1 * | 8/2003 | Bailey et al. | 345/830 |
| 2003/0163537 | A1 | 8/2003 | Rohall et al. | 709/206 |
| 2003/0167310 | A1 | 9/2003 | Moody et al. | 709/206 |
| 2003/0226152 | A1 * | 12/2003 | Billmaier et al. | 725/135 |
| 2004/0056899 | A1 | 3/2004 | Sinclair, II et al. | 345/800 |
| 2004/0243926 | A1 | 12/2004 | Trenbeath et al. | 715/501.1 |
| 2004/0260756 | A1 * | 12/2004 | Forstall et al. | 709/200 |
| 2004/0268265 | A1 | 12/2004 | Berger | 715/752 |
| 2005/0108345 | A1 | 5/2005 | Suzuki | 709/206 |
| 2005/0108351 | A1 | 5/2005 | Naick et al. | 709/207 |
| 2006/0271381 | A1 | 11/2006 | Pui | 705/1 |

FOREIGN PATENT DOCUMENTS

| | | |
|---|---|---|
| KR | 2002-0050785 | 6/2002 |
| WO | WO 97/24684 | 7/1997 |
| WO | WO 01/23995 | 4/2001 |

OTHER PUBLICATIONS

Smith, Mark A.; Fiore, Andrew T, "Visualization Components for Persistent Conversations," pp. 136-143, CHI 2001, Mar. 31-Apr. 4, 2001.*

Rohall, Steven L.; Gruen, Daniel; Moody, Paul; Kellerman, Seymour, "Email Visulaizations to Aid Communications," IEEE Symposium on Information Visualization, Oct. 22-23, 2001.*

* cited by examiner

FIG. 2B

| | | | | Secondary Highlighting 248 |
| | | | | Selection Highlighting 244 |

Day 1 (12 items off screen)
- Laura Hanson — For Thursday's budget meeting
- Sue Cassin — Diversity hiring goals
2:00 pm
- John Delay — Let's hook up for the awards dinner
- John Delay — my cellphone number
4:00
- David Corell — Distribute last minute changes to budget team — HR Teamroom
- ChemDigest — Chemicals Digest: Day 1
- Plastic Daily — Plastics Daily: New OSHA Fumes Rule has Indus...
- Accounting — Latest numbers on research lab aquisition — Finance Teamrm
- Ben Fields (36 items) — Newsletter DB
6:12
- Laura Hanson — 6+ Vulcan:Presentation:Review:Thur. at 4pm — Newsletter DB
- John Delay — Optional reading for the budget review — Finance Teamrm
  Awards dinner listings Day 2
7:00 am
- Sue Cassin — Hiring meeting agenda (thur 5pm)
- Laura Hanson — FYI: We are seeing DuPont this week Day 3
7:18
- Mike Rowles — 6+ Re: Vulcan wants longer contract — Sales Leads
- Ben Fields — Join us for a special evening
- Austin Chem — Consolidated Plastics wins RebokMP3 contract
- CP Marketing — GE Roadmap presentation first draft
9:00
- Jane Rolles — Marsha's party location
- Sam Racicot — Can we meet next week? — + Sales lead

SYSTEM AND METHOD FOR PROVIDING A CATEGORY SEPARATOR IN A LIST OF DOCUMENTS

CROSS-REFERENCE TO RELATED APPLICATIONS

This application is related to the commonly owned U.S. patent applications entitled "System and Method for Color Coding List Items," U.S. patent application Ser. No. 10/745,485, "System and Method for Secondary Selection Highlighting," U.S. patent application Ser. No. 10/745,486, and "System and Method for Scrolling Among Categories in a List of Documents," U.S. patent application Ser. No. 10/745,482, each filed herewith and incorporated by reference in its entirety.

FIELD OF THE INVENTION

The invention relates to features to assist a user in selecting, identifying, and handling items such as email messages.

BACKGROUND OF THE INVENTION

Some conventional systems provide a category separator that remains onscreen when some of the items in the category have been scrolled off-screen. To the extent that a given category includes more items than can be displayed on the screen at a given time, some number of items may have been scrolled off screen above the fixed separator. Often, a user must engage in trial and error to determine how many, if any, items from a category are hidden from view above the fixed separator.

What is needed is a mechanism to provide an indicator that indicates to the user the number of items that are off the screen for a particular category.

SUMMARY OF THE INVENTION

The invention relates to category navigation features that assist a user in selecting, identifying, and handling items such as email messages. More particularly, the invention includes an indicator that provides the user with a number of items that are off the screen for a particular category. In some embodiments, the invention may also facilitate scrolling directly to a first item in a next category or a previous category.

In some embodiments of the invention, a category navigation module displays items by categories. Categories may include items, such as emails, separated based on their various fields or attributes, such as author, subject matter, importance, or any other category. Items in categories are separated with a category separator bar.

In some embodiments of the invention, when the user scrolls through the items in a particular category such that some of the items in the particular category are scrolled off screen, the category separator bar remains in view by becoming fixed in the first line of the list and thus does not scroll off screen.

In some embodiments of the invention, while items included in a particular category are scrolled above the fixed category separator bar, the category navigation module may also displays an indicator that provides the user with a number of items that are off the screen for a particular category. The indicator therefore allows the user to easily identify how many items in a particular category are not displayed on the screen.

In some embodiments of the invention, a similar category separator bar may be used alone or in conjunction with that discussed above, that remains fixed on the last line of the screen for items in the category below those displayed.

In some embodiments of the invention, the category navigation module provides a mechanism, which may be accessed via a command, that causes a first entry of a particular category to be scrolled into view. Accordingly, when the user invokes this command, the first item of the particular category is displayed.

In some embodiments of the invention, if all items of a particular category are displayed on the screen, one or both of the indicator and the command may not be displayed.

Other objects and features of the invention will become apparent from the following detailed description considered in connection with the accompanying drawings. The drawings are designed for purposes of illustration only and the invention is not limited to the particulars shown therein. Various alternatives and modifications within the scope of the invention will be apparent from the description contained herein.

DETAILED DESCRIPTION OF THE INVENTION

Various embodiments of the invention are described below in terms of email systems that include one or more messages. However, it will become apparent from reading the following specification how various aspects of the invention may be used with other types of systems that include one or more items, such as, for example, file systems.

Figure 1:
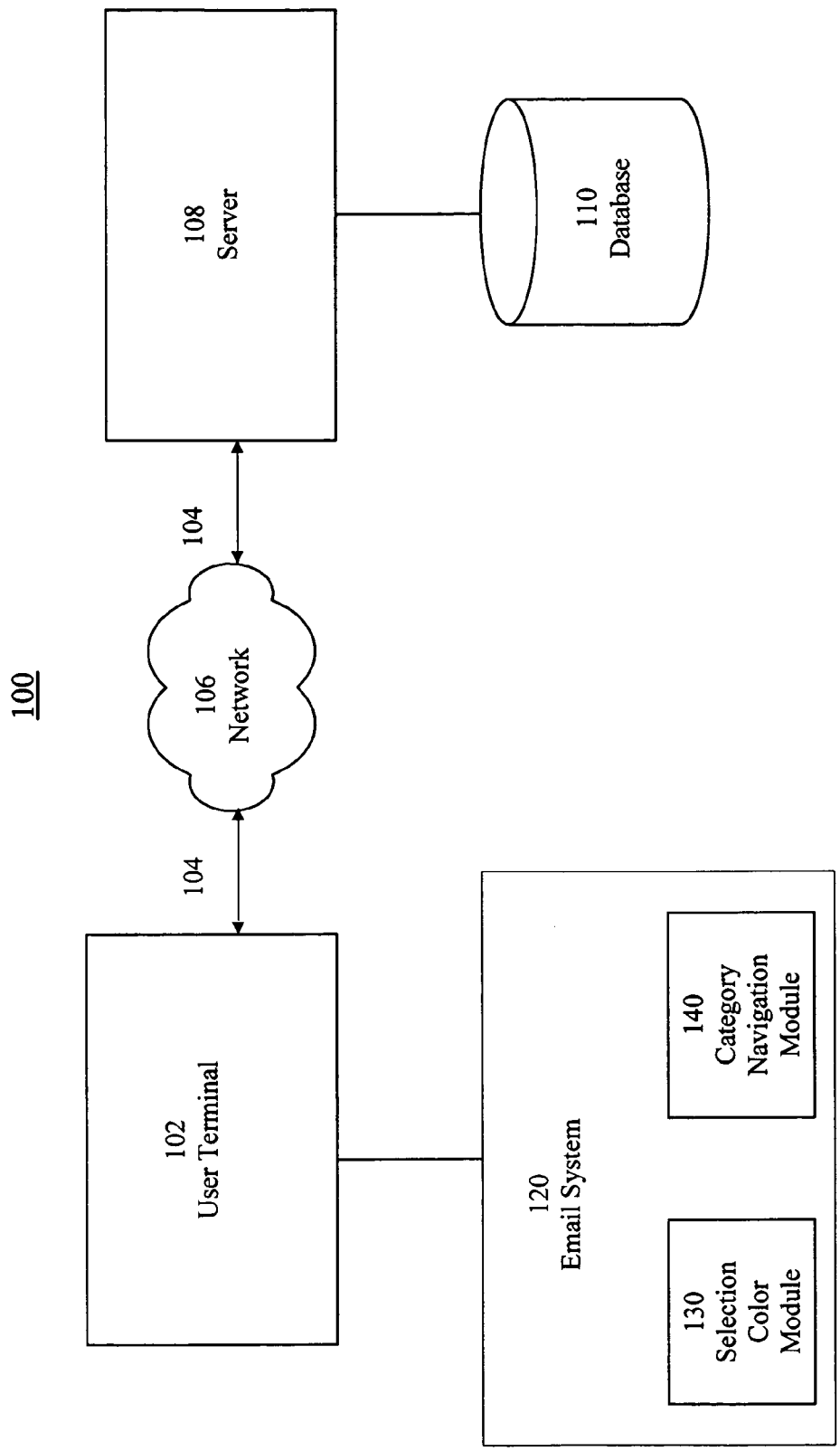
FIG. 1 illustrates a system according to one embodiment of the invention.

FIG. 1 illustrates a system 100 that may be used in accordance with various embodiments of the invention. Accordingly to the invention, system 100 may provide various features, such as, for example, enhanced visual email features, to assist a user in selecting, identifying, and handling items, such as email messages. In some embodiments of the invention, system 100 includes one or both of a selection color module 130 and a category navigation module 140. Selection color module 130 may provide the user with various color coordination features. Category navigation module 140 may assist the user in navigating the displayed messages.

In the embodiments illustrated in FIG. 1, selection color module 130 and category navigation module 140 may be utilized on or in conjunction with an email system 120 located at or operable with a user terminal 102. Although various embodiments of the invention are described utilizing selection color module 130 and category navigation module 140 on user terminal 102, it shall be understood by those skilled in the art that selection color module 130 and/or category navigation module 140 may be located on a 108 server or any machine or machines associated with user terminal 102.

User terminal 102 is coupled to a server 108 over a network 106 via a communications link 104. Examples of user terminal 102 may include any one or more of, for example, a desktop computer, a laptop or other portable computer, a hand-held computer device such as a Blackberry, a Personal Digital Assistant (PDA), a web-enabled mobile phone, or a Palm Pilot, or any other computer device.

Network 106 may include any one or more networks. For instance, network 106 may include the Internet, an intranet, a PAN (Personal Area Network), a LAN (Local Area Network), a WAN (Wide Area Network), a SAN (Storage Area Network), a MAN (Metropolitan Area Network), or other network.

Communications link 104 may include any one or more communications links. For instance, communications link 104 may include a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, or other communications link.

Server 108 may be or include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

As illustrated in FIG. 1, a database 110 may be operatively coupled to server 108. Database 110 may store or otherwise include any information or data used by system 100. Although database 112 is illustrated as operatively coupled to server 108, it shall be understood by those skilled in the art that database 112 may be located on user terminal 102 or any machine or machines associated with user terminal 102 or operatively coupled to server 108 via a network as would be apparent.

Database 112 may store or otherwise include any type of data or information. Database 112 may include, or interface to, for example, the Oracle™ relational database sold commercially by Oracle Corporation, Informix™, DB2 (Database 2) or other data storage or query formats, platforms, or resources such as OLAP (On Line Analytical Processing), SQL (Standard Language Query), a SAN (storage area network), Microsoft Access™ or any other type of database.

Figure 2:
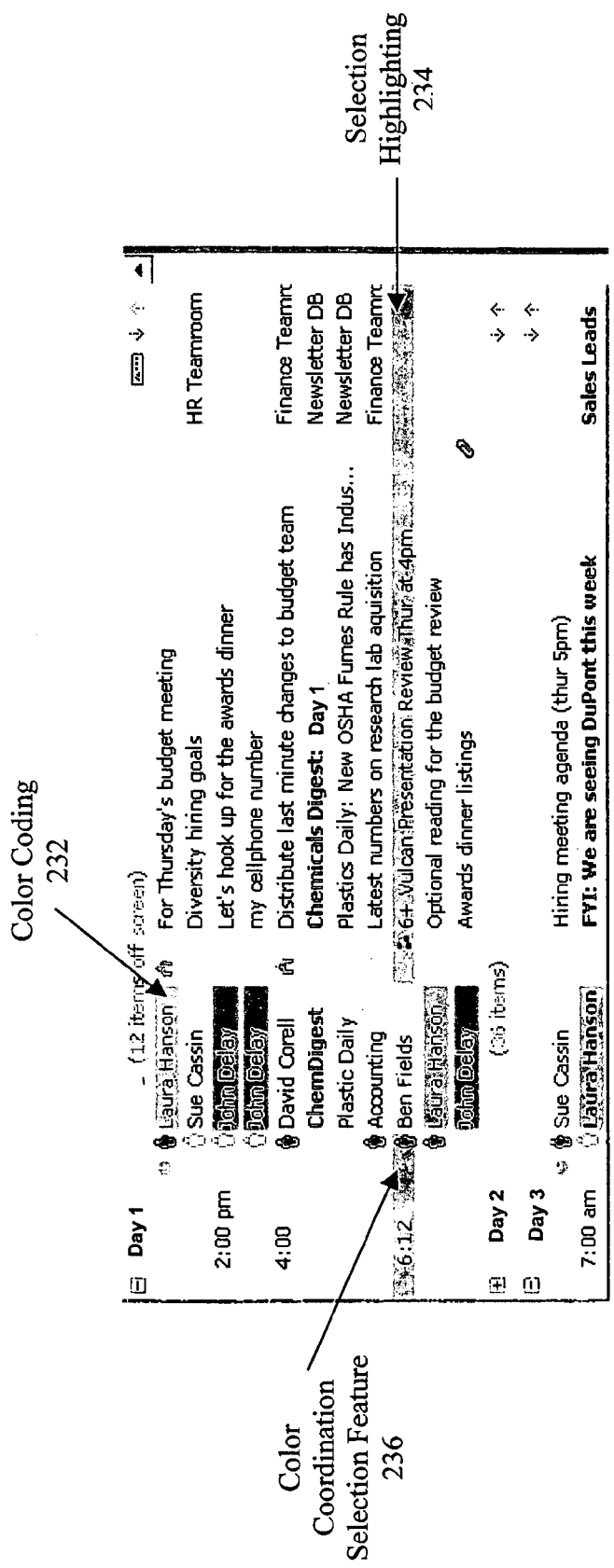
FIGS. 2A and 2B illustrate various features provided by a selection color module according to various embodiments of the invention.

FIG. 2A illustrates various color coordination selection features provided by selection color module 130 to assist a user in selecting, identifying, and/or handling email messages in accordance with one or more embodiments of the invention. Selection color module 130 provides for both a color coding 232 and a selection highlighting 234 of an item so that a user may distinguish between the two, as described below.

Some conventional email systems use color coding 232 to identify certain items that have a field or attribute with a particular value allowing these items to be easily identified. In FIG. 2A, for example, a name "Laura Hanson" is color coded in green, a name "John Delay" is color coded in pink, and a name "Ben Fields" is color coded in yellow. As illustrated, color coding 232 is typically applied to the particular field or attribute (i.e., the name, date, subject), rather than the entire message that includes the particular attribute.

Some conventional email systems use selection highlighting 234 to indicate that a particular message has been selected. In conventional systems, selection highlighting 234 results in the entire line corresponding to a selected message to be highlighted with a particular color. For example, as illustrated in FIG. 2A, a message from "Mike Rowles" is highlighted in a royal blue color to indicate it as the selected message.

In some embodiments of the invention, selection highlighting 232 and color coding 234 are combined into a color coordination selection feature 236 with regard to a single message whereby a user may distinguish between them. In some embodiments of the invention, selection color module 130 implements a selection coloring mechanism or process that color codes one or more portions of the selected item that have a particular value(s) and highlights the remaining portions of the selected item. According to the invention, if both selection highlighting 232 and color coding apply to the selected item, both may be distinguished by a user. As will be discussed in further detail below, selection highlighting 232 may be applied to a selected messages as well as messages related to the selected message. As would be appreciated, color coordination selection feature 236 may be applied to various messages—selected, related, or otherwise—to coordinate aspects of more than one color or highlighting operation applied to a single message.

As illustrated in FIG. 2A, a message from "Ben Fields" entitled "6+ Vulcan Presentation Review Thur at 4 pm" illustrates color coordination selection feature 236 that combines color coding 232 and selection highlighting 234. Color coding 232 results in "Ben Fields" being color coded in yellow, while the remaining portions of the message are highlighted in light blue.

As will be discussed in further detail below with regard to other aspects of the invention, highlighting, such as selection highlighting 234, may be applied to a selected messages as well as messages related to the selected message. As would be appreciated, color coordination selection feature 236 may be applied to various messages—selected, related, or otherwise—to coordinate aspects of more than one color or highlighting operation applied to a single message.

FIG. 2A illustrates another color coordination selection feature provided by selection color module 130 to assist a user in selecting, identifying, and/or handling email messages in accordance with one or more embodiments of the invention. Selection color module 130 provides for a secondary highlighting features to indicate to a user a relationship between a selected message and one or more other messages.

In some embodiments of the invention, secondary highlighting is applied to a message when that message is related to a message selected by the user. Once a user selects a message, selection color module 130 determines if any other messages are related to the selected message. For example, FIG. 2B illustrates a selection highlighting 244 (similar to selection highlighting 234 in FIG. 2A), in which a selected message from "Mike Rowles" entitled "6+ Re: Vulcan wants longer contact" is highlighted in a royal blue color. A message from "Ben Fields" entitled "6+ Vulcan Presentation Review Thur at 4 pm" is related to the selected message. According various embodiments of the invention, a secondary highlighting 248 is applied to the related message (i.e., the message from "Ben Fields"). In this example, the related message is highlighted in a light blue color. As would be appreciated, various colors for secondary highlighting 248 may be used, including the same color applied for selection highlighting 244.

Messages may be identified as related to the selected message through various mechanisms. One mechanism includes identifying items with matching attribute values, such as subject matter or keywords included in the subject line or message itself. Other mechanisms may utilize various threading services such as those described in U.S. patent application Ser. No. 10/334,087 (Publication No. U.S.20030163537A1), entitled "Method and Apparatus for Handling Conversation Threads and Message Groupings as a Single Entity," filed Dec. 30, 2002, and U.S. patent application Ser. No. 09/995, 151 (Publication No. U.S.20030101065A1), entitled "Method and Apparatus for Maintaining Conversation Threads in Electronic Mail," filed Nov. 27, 2001, the specifications of which are herein incorporated by reference in their entirety. It should be noted that the invention is not limited to any particular mechanism for determining threads among a set of documents including email messages. Once the selection color module determines if there are any related messages, the related messages are indicated as such using secondary highlighting 248.

As would be appreciated, various colors for secondary highlighting 248 may be used, including the same color applied for selection highlighting 244. In some embodiments of the invention, the color of secondary highlighting 248 (i.e., "secondary color") is based on or otherwise related to the color of selection highlighting 244 (i.e., "selection color"). In these embodiments, when the selection color is changed, the secondary color is changed in accordance with the selection color. In some embodiments of the invention, the secondary color is changed in proportion to the change in the selection color. In some embodiments of the invention, the secondary color is derived from the selection color. For example, as illustrated in FIG. 2B, a light blue color is used for secondary highlighting 248, which is derived from a royal blue color of selection highlighting 244.

Coordination the selection color with the highlighting color is desirable for aesthetic reasons. This coordination also assists the user in identifying the various highlighted items, especially, when high contrast colors are used.

Figure 3:
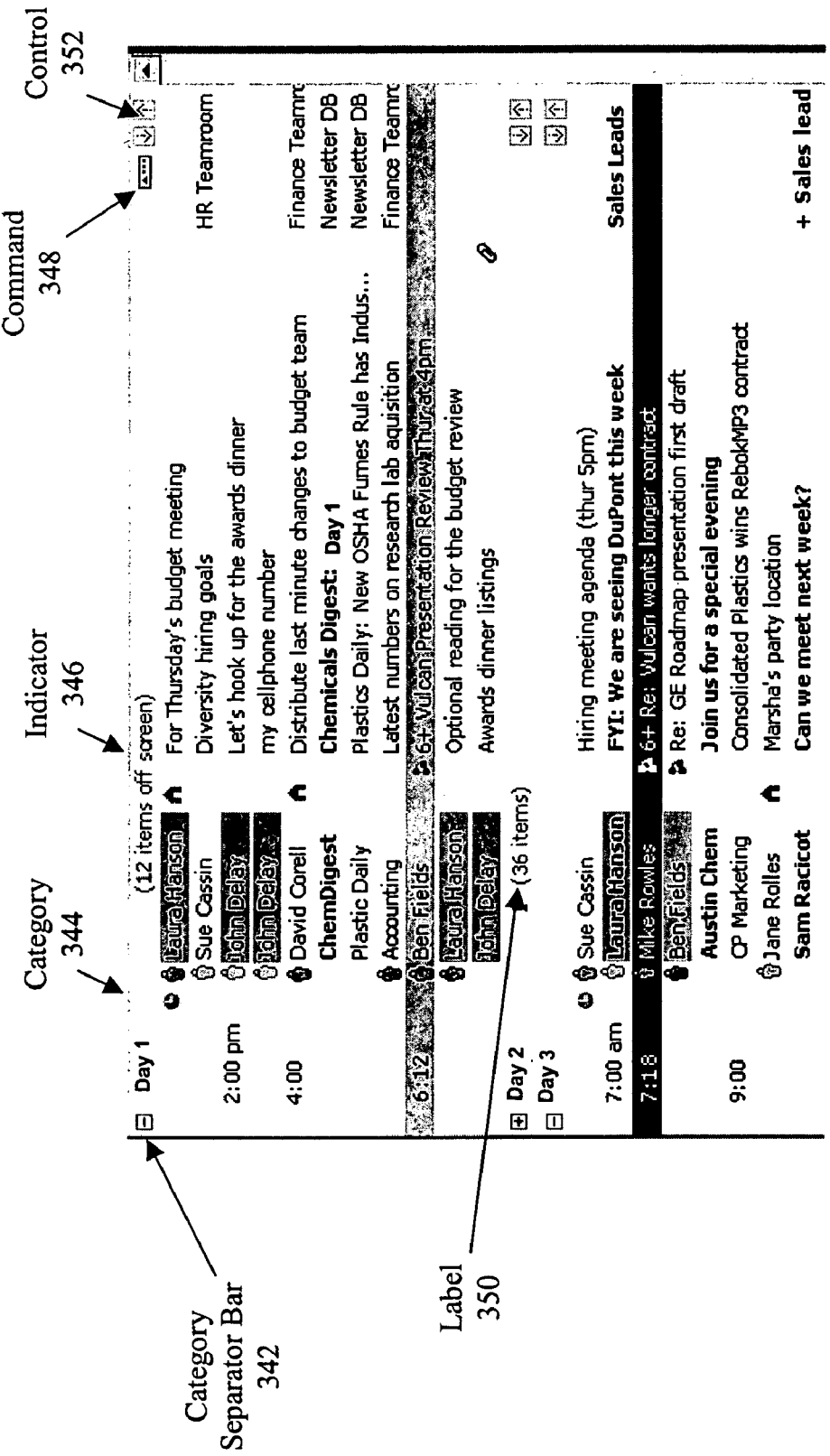
FIG. 3 illustrates features provided by a category navigation module according to one embodiment of the invention.
Figure 4:
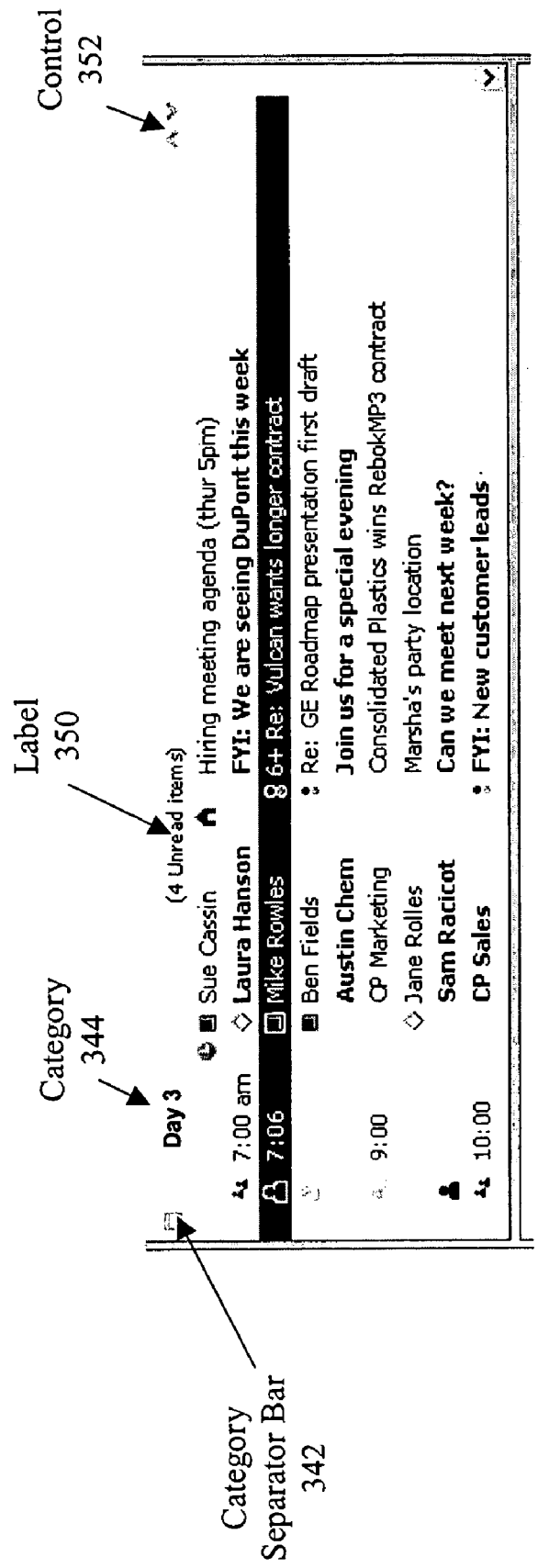
FIG. 4 illustrates a label that indicates a number of items in a particular category of items according to one embodiment of the invention.

FIG. 3 and FIG. 4 illustrate various aspects of the invention provided via category navigation module 140. Category navigation module 140 assists the user with navigating among displayed items, such as email messages.

FIG. 3 illustrates an indicator 346 that provides a user with a number of items that are "off screen" for a particular category 344. In some embodiments of the invention, off screen items may include those items "above" the first line on a display. In other embodiments of the invention, off screen items may include those items "below" the last line on a display. In still other embodiments, off screen items include both those above and below the first and last lines, respectively.

In some embodiments of the invention, category navigation module 140 displays items, such as email messages, by categories, such as a category 344. For example, in FIG. 3, category 344 includes a date. As illustrated, these dates include: "Day 1," "Day 2," and "Day 3." Messages may be separated into various categories as would be appreciated, including, but not limited to, author, subject matter, importance, or any other category.

In some embodiments of the invention, categories 344 are separated with a category separator bar 342. Category separator bar 342 controls the display of categories 344 such that the user may expand or collapse the messages included therein. For example, as illustrated in FIG. 3, messages in "Day 1" and "Day 3" are expanded, whereas messages in "Day 2" are collapsed.

In some embodiments of the invention, when a user scrolls through the messages included in a particular category 344, such that some messages of the particular category 344 are scrolled off screen above the first line, category separator bar 342 remains in view by becoming fixed in the first line of the display.

In some embodiments of the invention, while messages included in a particular category 344 are partially on-screen with some messages scrolled above the fixed category separator bar 342, category navigation module 140 may display indicator 346 that provides the user with an indication of a number of messages that are off screen for that category 344. For example, in FIG. 3, indicator 346 reads "12 items off screen" to illustrate to the user that 12 messages included in the category "Day 1" are not displayed on the screen. As would be appreciated, indicator 346 may refer to a number of items above the first line, a number of items below the last line, or a combination of the two.

In some embodiments of the invention, if all messages in a particular category 344 are displayed on the screen, indicator 346 may not be displayed. For example, as illustrated in FIG. 3, there is no indicator 346 for the category entitled "Day 3," illustrating to the user that all messages in the category are displayed on the screen.

In some embodiments of the invention, category navigation module 140 provides a command 348 that causes the first entry of a particular category 344 to be scrolled into view. Accordingly, when indicator 346 illustrates to the user that a certain number of items of a particular category 344 are off screen, the user can invoke command 348 thereby causing the first message of the particular category 344 to be displayed. When the user selects command 348, no items of the particular category 344 are located above category separator bar 342.

In some embodiments of the invention, if all messages of a particular category 344 are displayed on the screen, command 348 is not displayed. Because all messages in the particular category 344 are displayed on the screen, the first message of the particular category 344 is already displayed and there may be no need to provide this functionality. For example, as illustrated in FIG. 3, the category line separator for "Day 3" does not include a command 348 because all messages in the category are already displayed on the screen. If a message in such a category becomes displaced from the screen, command 348 would be included in this category line separator as would be appreciated.

In some embodiments of the invention, category navigation module 140 may provide a label 350 to indicate the number of items in a particular category 344 matching a particular criteria. The particular criteria may be directed toward any characteristic of the message including, but not limited to, a number of messages included in a particular category, a status of the messages (i.e., unread or read), a level of importance of the messages (i.e., urgent or high importance), or other characteristic of the message(s).

For example, as illustrated in FIG. 3, label 350 corresponds to a number of messages included in the category "Day 2" as "36 items". As illustrated, label 350 may be provided even when category separator bar 342 is collapsed and not showing any messages included in a particular category 344.

A further example is illustrated in FIG. 4 where a label 350 corresponds to a number of items unread ("4 Unread items") in the category "Day 3." Label 350 may be displayed when indicator 346 is not required (i.e., all messages in the category are displayed on the screen), when indicator 346 is not desired to be displayed (i.e., the user does not want indicator 346 to be displayed), when indicator 346 is not able to be displayed (i.e., email system 120 cannot display indicator 346), or in conjunction with indicator 346 (i.e., indicator 346 and label 350 may both be located in category separator line). Further, in some embodiments of the invention, category navigation module 140 may display multiple labels 350 to illustrate various characteristics of a particular category 344.

According to another embodiment of the invention, category navigation module 140 may provide a control 352 on at least one category separator line 342 for scrolling between categories. As illustrated in FIGS. 3 and 4, control 352 may include an "up" arrow symbol to correspond with, for example, a previous category, and a "down" arrow symbol to correspond with, for example, a next category. However, various symbols or indicators may be used to indicate scrolling between next or previous categories.

In some embodiments of the invention, control 352 changes the selected category from one category to either the next category or the previous category, depending on which symbol is invoked. If more than one category is displayed on the screen, these categories continue to be displayed while the selected category is changed via control 352. For example, as illustrated in FIG. 3, a user wishing to display a category corresponding to Wednesday of the prior week may do so by invoking control 352 on category separator bar 342 for "Day 2" a number of times. More specifically, the user may click the up arrow symbol seven times, each of which would change the selected category to the previous day, ultimately changing to the same weekday in the prior week.

In some embodiments of the invention, when control 352 is invoked, the categories remain in their positions relative to one another, and the display scrolls back through each of the prior days. In other embodiments of the invention, only the category corresponding to the invoked control 352 is changed while the other categories displayed remain the same. Thus, in the example described above where the user invoked the up arrow symbol seven times, the display of FIG. 3 would include the categories for "Day 1" and "Day 3" while the "Day 2" category will have been changed to "Day-5" (i.e., corresponding to the same weekday in the prior week).

While particular embodiments of the invention have been described, it is to be understood that modifications will be apparent to those skilled in the art without departing from the spirit of the invention. The scope of the invention is not limited to the specific embodiments descried herein. Other embodiments, uses and advantages of the invention will be apparent to those skilled in art from consideration of the specification and practice of the invention disclosed herein. The specification should be considered exemplary only, and the scope of the invention is accordingly intended to be limited by the following claims.

What is claimed is:

1. A method for presenting one or more categories of related items to a user via a display, the display having a plurality of display lines, the method comprising:
   presenting at least a portion of a first category of related items, and
   presenting at least a portion of a second category of related items, wherein each presented item is presented to the user on at least one display line on the display;
   presenting a category separator disposed between or in connection with the portion of the first category of related items and the portion of the second category of related items;
   scrolling the first category of related items, the second category of related items, and the category separator in response to one or more actions by the user;
   maintaining the category separator at a predetermined position on the display in response to further of said one or more actions by the user once the category separator reaches the predetermined position of the display;
   associating the category separator with the second category of related items, the category separator including a displayed value that indicates a number of related items in the second category of related items that have been scrolled out of view of the display; and
   updating the displayed value in response to said scrolling.

2. The method of claim 1, wherein said presenting a category separator disposed between or in connection with the portion of the first category of related items and the portion of the second category of related items comprises presenting a category separator that substantially includes one of the plurality of display lines.

3. The method of claim 1, wherein said presenting a category separator disposed between or in connection with the portion of the first category of related items and the portion of the second category of related items comprises presenting a category separator in conjunction with a display line used to display a first item of the second category of related items.

4. The method of claim 1, wherein said presenting a category separator disposed between or in connection with the portion of the first category of related items and the portion of the second category of related items comprises presenting a category separator in conjunction with a display line used to display a last item of the first category of related items.

5. The method of claim 1, wherein the predetermined position of the display comprises a first line of the display.

6. The method of claim 1, wherein the predetermined position of the display comprises a last line of the display.

7. The method of claim 1, further comprising removing the category separator from the display once none of the second category of related items are presented.

8. The method of claim 1, wherein the items comprise documents.

9. The method of claim 8, wherein the documents include messages.

10. The method of claim 9, wherein the messages include email messages.

11. The method of claim 8, further comprising:
   presenting a first related document of the first category of documents at a predetermined position of the display in response to one or more actions by the user.

12. The method of claim 11, wherein said presenting a first related document of the first category of documents at a predetermined position of the display comprises presenting the first related document on the first line of the display.

13. The method of claim 11, wherein said presenting a first related document of the first category of documents at a predetermined position of the display comprises presenting the first related document on the second line of the display, and further comprising presenting the category separator on the first line of the display.

14. The method of claim 1, the category separator comprising either a control that presents a previous category by scrolling to the previous category or a control that presents a subsequent category by scrolling to the subsequent category.

15. The method of claim 1, the category separator comprising a control that presents a previous category by scrolling to the previous category and a control that presents a subsequent category by scrolling to the subsequent category.

16. The method of claim 1, the category separator comprising a control that presents the first item of a category of related items, wherein no item of the category of related items is presented above the category separator.

17. The method of claim 1, the category separator comprising a control that collapses a category of related items by reducing the number of related items presented.

18. The method of claim 1, the category separator comprising a control that expands a category of related items by increasing the number of related items presented.

* * * * *